United States Patent [19]

Swinderman

[11] Patent Number: 5,378,202
[45] Date of Patent: Jan. 3, 1995

[54] TENSIONING DEVICE

[75] Inventor: R. Todd Swinderman, Kewanee, Ill.

[73] Assignee: Martin Engineering Company, Neponset, Ill.

[21] Appl. No.: 152,416

[22] Filed: Nov. 15, 1993

[51] Int. Cl.$^6$ .............................................. F16H 57/00
[52] U.S. Cl. ................................. 474/92; 474/111; 464/97; 464/23; 464/161; 198/499
[58] Field of Search ........... 474/92, 101, 110, 111; 198/499, 813; 464/55, 56, 70, 97, 160, 161, 182, 23

[56] References Cited

U.S. PATENT DOCUMENTS

| | | | |
|---|---|---|---|
| 2,867,102 | 1/1959 | Williams | 464/88 |
| 2,867,103 | 1/1959 | Williams | 464/88 |
| 2,943,465 | 7/1960 | Musser | 464/23 X |
| 3,064,797 | 11/1962 | Besel et al. | 198/813 |
| 3,406,583 | 10/1968 | Baier | 464/23 X |
| 3,674,131 | 7/1972 | Matson | 198/499 |
| 3,782,515 | 1/1974 | Cowen | 198/790 X |
| 3,782,534 | 1/1974 | Holleman | 474/92 X |
| 4,171,920 | 10/1979 | Kramer et al. | 403/223 |
| 4,265,358 | 5/1981 | Veenhof | 198/499 |
| 4,280,768 | 7/1981 | Pardue, Jr. et al. | 403/337 X |
| 4,432,245 | 2/1984 | Hattori et al. | 464/97 X |
| 4,533,035 | 8/1985 | Reiter | 198/499 |
| 4,533,036 | 8/1985 | Gordon | 198/499 |
| 4,664,250 | 5/1987 | Jakobs | 198/499 |
| 4,696,382 | 9/1987 | Aho | 403/1 X |
| 4,825,997 | 5/1989 | Bowman et al. | 198/499 |
| 4,925,434 | 5/1990 | Swinderman et al. | 474/101 |
| 4,969,553 | 11/1990 | Stoll | 198/499 |
| 4,995,851 | 2/1991 | Taylor et al. | 474/101 |
| 5,012,874 | 5/1991 | Stridsberg | 464/97 X |
| 5,088,965 | 2/1992 | Swinderman et al. | 474/101 |
| 5,149,305 | 9/1992 | Gordon | 474/101 |
| 5,197,587 | 3/1993 | Malmberg | 198/499 X |
| 5,222,589 | 6/1993 | Gordon | 198/499 X |

Primary Examiner—Roger J. Schoeppel
Attorney, Agent, or Firm—Lee, Mann, Smith, McWilliams, Sweeney & Ohlson

[57] ABSTRACT

A tensioning device for imparting torsional bias to a shaft. The tensioning device includes a coupling member of resilient material having a first end and a second end. The first end of the coupling member is connected to the shaft for rotation therewith. A driven member is connected to the second end of the coupling member such that the driven member is relatively rotatable with respect to the shaft. A drive member is associated with the driven member for selectively rotating the driven member to any of a number of infinitely variable positions. The tensioning device is effective to rotate the shaft to a desired position and to store torsional force in the coupling member when the second end of the coupling member is rotated with respect to the first end of the coupling member. The tensioning device includes a torsion indicating member for indicating the amount of torsional force being applied to the shaft by the coupling member.

28 Claims, 3 Drawing Sheets

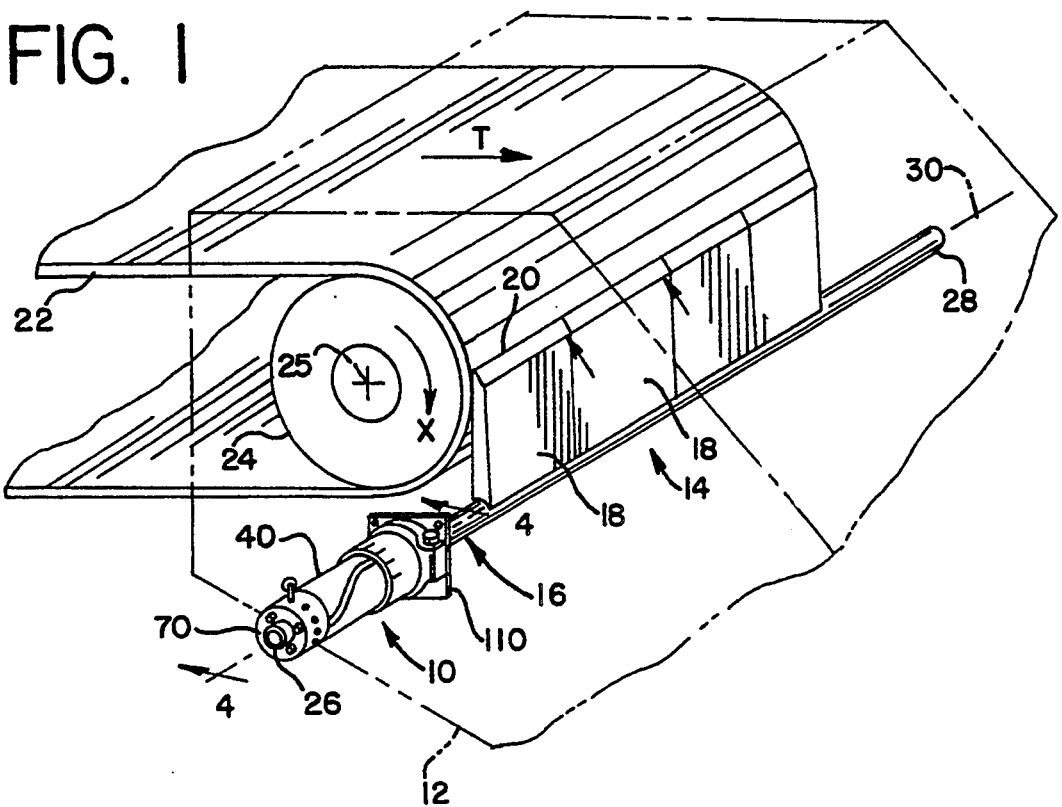
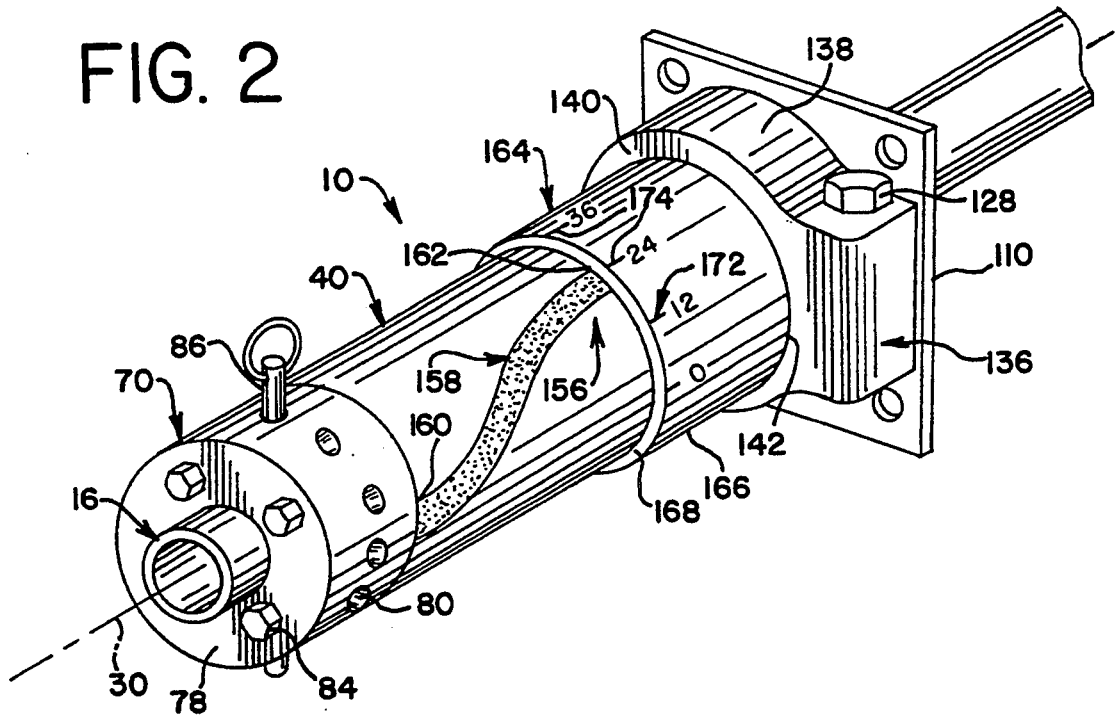

TENSIONING DEVICE

BACKGROUND OF THE INVENTION

The present invention relates to a tensioning device which is used to select and impart a moment of torque to a shaft. The present tensioning device has been found to be particularly useful in connection with conveyor belt cleaners which utilize scraper blades to clean a conveyor belt.

Conveyor belt cleaning devices typically include a shaft which is positioned transverse to the direction of conveyor belt travel and one or more scraper blades mounted on the shalt. When the shaft is rotated, the blades are forced into engagement with the conveyor belt such that the blades will scrape adherent material from the belt. The scraper blades wear during use such that the scraper blades contact the belt with a continually diminishing force, and may entirely lose contact with the belt, thereby hampering the scraper blades' cleaning ability. The shaft on which the scraper blades are mounted must therefore be rotated as the blades wear to reposition the scraper blades against the conveyor belt with the desired amount of force.

Torsional tensioning devices of the type shown in U.S. Pat. No. 5,149,305 have been used in connection with conveyor belt cleaners. In this prior device an operator rotates a worm by hand with an Allen wrench to impart rotational bias to the conveyor belt cleaner shaft. In this device the worm is coupled directly to the shaft such that any rotation of the shaft will result in a corresponding rotation of the worm about the longitudinal axis of the shaft. Such an arrangement exposes the operator to potential injury. Scraper blades are subjected to repeated impact forces which are generated by the blades coming into contact with conveyor belt splices and with enlarged pieces of the conveyed material or other material which adheres to the belt, all of which may cause sudden rotation of the shaft. In addition the conveyor belt itself may grab the scraper blades causing a large sudden rotation of the shaft. In the prior device such shaft rotations are directly transmitted to the operator through the corresponding rotation of the worm about the axis of the shaft and may potentially cause injury to the operator. Such arrangements in the past have resulted in injuries to operators when the operator is applying a wrench to the drive member and a splice is encountered by the cleaner blades, and when a wrench is inadvertently left on the drive member and comes flying off upon a sudden rotation of the shaft.

SUMMARY OF THE INVENTION

The present invention provides a tensioning device which is particularly useful for imparting torsional bias to a shaft to rotate conveyor belt scraper blades into contact with a conveyor belt with a desired amount of force and to store torque in the tensioning device to maintain the desired contact between blade and belt. The tensioning device includes a torsion coupling member such as a torsion tube made of resilient material having a first end and a second end. A hub is connected to the first end of the tube and a pin is inserted through the hub and the shaft thereby connecting the hub and the first end of the tube to the shaft for conjoint rotation. A driven member such as a worm gear is connected to the second end of the tube such that the driven member is relatively rotatable with respect to the shaft about a first axis. A drive member such as a worm is associated in operative engagement with the driven member for selectively rotating the driven member to any of a number of infinitely variable positions. The drive member is rotatable about a second axis which is distinct from the first axis. The drive member is rotatably connected to a stationary frame. The tensioning arrangement is effective to rotate the shaft to a desired position and to store a torsional biasing force in the tube when the second end of the tube is rotated with respect to the first end of the tube by rotation of the drive member. The tensioning device also includes an indicating device for indicating the degree of rotation of the second end of the tube with respect to the first end thereby indicating the amount of torsional biasing force stored in the tube and being applied to the shaft. The tensioning device utilizes the resilient torsion coupling member as a shock absorber disposed between the shaft and the drive member. Additionally this arrangement is effective to prevent the transmission of movement from the shaft to the drive member.

DESCRIPTION OF THE DRAWINGS

FIG. 1 is a perspective view of the tensioning device shown installed on a conveyor belt cleaner in a tensioned condition.

FIG. 2 is a perspective view of the tensioning device shown attached to a shaft in a tensioned condition.

DESCRIPTION OF THE PREFERRED EMBODIMENTS

Figure 4:
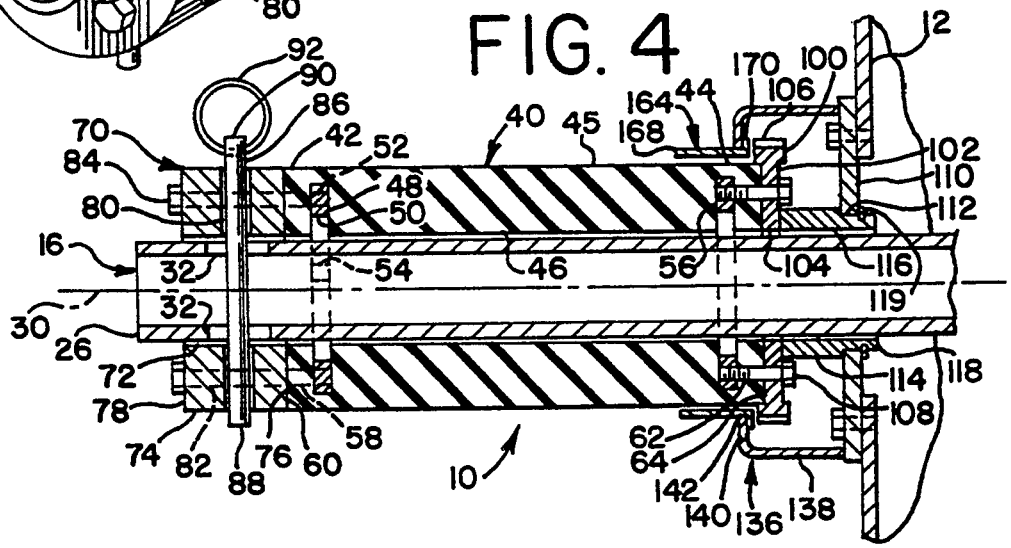
FIG. 4 is a cross-sectional view of the tensioning device taken along the lines 4—4 of FIG. 1.

FIG. 1 illustrates a tensioning device 10 connected at one end to a stationary conveyor chute 12 and at a second end to a conveyor belt cleaner 14. The belt cleaner 14 is shown as a primary conveyor belt cleaner, however, the tensioning device 10 may also be used with secondary conveyor belt cleaners. The belt cleaner 14 includes a cross-shaft 16 and one or more scraper blades 18 mounted thereon. The shaft 16 is illustrated as a circular pipe but may be made of rectangular tubing or other shapes as desired. Each scraper blade 18 includes a scraping edge 20 adapted to contact a conveyor belt 22 for the removal of adherent material from the belt 22. As shown in FIG. 1 the conveyor belt 22 extends around a pulley 24 which rotates about an axis 25 in a direction shown by the arrow "X". The rotation of the pulley 24 causes the belt 22 to rotate and travel in a direction as generally indicated by the arrow "T", The shaft 16 extends between a first end 26 and a second end 28 and is located generally transverse to the direction of conveyor belt travel "T" and generally parallel to the axis 25 about which the pulley 24 rotates. The first end 26 of the shaft 16 is rotatably mounted to the chute 12 by the tensioning device 10. The second end 28 of the shaft 16 is rotatably mounted to the chute 12 in a conventional manner such as by a sleeve (not shown). The shaft 16 is rotatable about its longitudinal axis 30 such that the scraping edge 20 of the scraping blades 18 may be rotated into or out of contact with the conveyor belt 22. As best shown in FIG. 4, the first end 26 of the shaft 16 includes a pair of slotted apertures 32 which extend through opposite sides of the shaft wall in alignment with one another. The slots 32 extend longitudinally along the length of the shaft 16.

The tensioning device 10 includes a resilient torsion coupling member which is illustrated in the form of a torsion tube 40. Under some circumstances a solid torsion coupling of resilient material could also be used. The torsion tube 40 extends between a first end 42 and a second end 44 as best shown in FIG. 4. The torsion tube 40 includes an outer cylindrical wall surface 45. A longitudinal bore 46 extends through the torsion tube 40 between the first end 42 and the second end 44. The diameter of the bore 46 is sized to be slightly larger than the diameter of the shaft 16. The torsion tube 40 is located concentrically around the first end 26 of the shaft 16o The walls of the torsion tube 40 may be various different thicknesses as desired and the length of the torsion tube 40 may be varied as desired. The torsion tube 40 is preferably made of a resilient material such as rubber having a hardness of 50 Shore A. The torsion tube 40 may also be made of other materials such as polyurethane if desired and in other hardnesses.

A ring 48 having a central aperture 50 is imbedded in the wall of the torsion tube 40 at the first end 42. The outer diameter of the ring 48 is smaller than the diameter of the outer wall surface 45 of the torsion tube 40, and the diameter of the central aperture 50 is larger than the diameter of the bore 46. The ring 48 includes a plurality of threaded apertures 52 equally spaced about the ring 48. The ring 48 also includes one or more apertures 54 located between each adjacent pair of threaded apertures 52. The ring 48 is integrally molded into the first end 42 of the torsion tube 40 such that the elastomeric material of the torsion tube 40 extends through the apertures 54 in the ring 48 to integrally connect the ring 48 to the tube 40 for conjoint rotation with the first end 42. A ring 56, which is identical in construction to the ring 48, is embedded in the wall of the torsion tube 40 at the second end 44 for conjoint rotation with the second end 44. A bore 58 extends inwardly from an outer face 60 of the torsion tube 40 to each threaded aperture 52 in the ring 48. A bore 62 extends inwardly from an inner face 64 of the torsion tube 40 to each threaded aperture 52 in the ring 56.

The tensioning device 10 also includes a hub 70 which is connected to the first end 42 of the torsion tube 40. The hub 70 includes a central bore 72 which is slightly larger in diameter than the diameter of the shaft 16 and a cylindrical outer surface 74 which is preferably the same diameter as the outer surface 45 of the torsion tube 40. The hub 70 also includes an inner side wall 76 and a spaced apart and parallel outer side wall 78. A plurality of bores 80 extend radially between the central bore 72 and the outer surface 74 of the hub 70. The bores 80 are uniformly spaced about the central bore 72 as shown in FIG. 2 such that each bore 80 is in radial alignment with an opposing bore 80 on the opposite side of the central bore 72. The hub 70 also includes a plurality of longitudinal bores 82 which extend through the hub 70 between the outer side wall 78 and the inner side wall 76. The longitudinal bores 82 are uniformly spaced about the central bore 72 and extend between the radial bores 80 such that the longitudinal bores 82 do not intersect the radial bores 80.

The hub 70 is placed over the first end 26 of the shaft 16 such that the shaft 16 extends through the central bore 72. The inner side wall 76 of the hub 70 is placed against the outer face 60 of the torsion tube 40 such that the longitudinal bores 82 are aligned in registration with the bores 58 and threaded apertures 52 in the ring 48. The hub 70 is rigidly attached to the first end 42 of the torsion tube 40 by fasteners 84, such as threaded bolts, which extend through the bores 82 and 58 and threadably engage the threaded apertures 52 in the ring 48. The hub 70 is thereby rigidly attached to the first end 42 of the torsion tube 40 for conjoint rotation therewith.

Two opposing radial bores 80 in the hub 70 are aligned in registration with the apertures 32 in the shaft 16. A pin 86 having a first end 88 and a second end 90 is inserted through the bores 80 in the hub 70 and the slotted apertures 32 in the shaft 16 to releasably connect the hub 70 and the first end 42 of the torsion tube 40 to the shaft 16 for conjoint rotation. The pin 86 may slide back and forth within the slotted apertures 32 thereby allowing the hub 70 to correspondingly slide back and forth longitudinally along the shaft 16 as limited by the length of the slotted apertures 32. A ring 92 is connected to the second end 90 of the pin 86 to prevent the pin 86 from sliding completely through the bores 80 and apertures 32 and to retain the pin 86 within the bores 80 and apertures 32. A cotter pin or other retaining mechanism may be attached to the first end 88 of the pin 86 if desired to inhibit removal of the pin 86 from the hub 70.

A driven member such as a worm gear 100 is connected to the second end 44 of the torsion tube 40 against the inner face 64. The worm gear 100 includes a circular flange 102 having a central circular aperture 104 and a plurality of teeth 106 located around the perimeter of the flange 102. The worm gear 100 is connected to the second end 44 of the torsion tube 40 by fasteners 108 which extend through the flange 102 of the worm gear 100 and the bores 62 of the torsion tube 40 and threadably engage the threaded apertures 52 in the ring 56. The fasteners 108 rigidly connect the worm gear 100 to the second end 44 of the torsion tube 40 for conjoint rotation therewith. The teeth 106 of the worm gear 100 are located radially beyond the outer surface 45 of the torsion tube 40. The central aperture 104 of the worm gear 100 is preferably the same diameter as the bore 46 of the torsion tube 40 such that the shaft 16 may extend therethrough.

A mounting plate 110 is removably-connected to the wall of the conveyor chute 12 over an aperture in the wall of the chute 12 through which the shaft 16 of the belt cleaner 14 extends. The mounting plate 110 includes a central circular aperture 112. A bushing 114 having a central bore 116 is connected to the worm gear 100. The shaft 16 extends through the bore 116. The bushing 114 includes a collar 118 which extends through the central aperture 112 of the mounting plate 110 such that the collar 118 is located between the shaft 16 and the mounting plate 110. The bushing 114 is rotatably connected to the mounting plate 110 by a snap ring 119 which is connected to the collar 118 such that the plate 110 is located between the snap ring 119 and a shoulder of the bushing 114 formed by the collar 118. The bushing 114 rotatably supports the shaft 16 in engagement with the mounting plate 110. The bushing 114 is preferably made of steel with a lining of nylon or ultra high molecular weight polyethylene in the bore 16.

Figure 3:
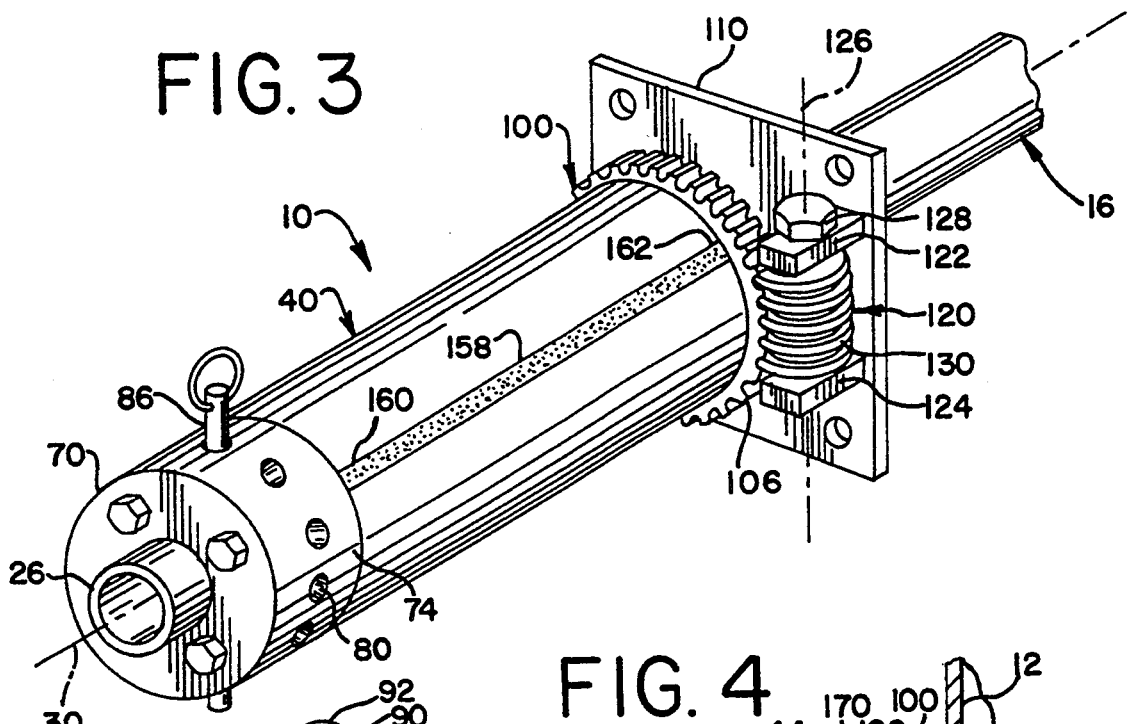
FIG. 3 is a perspective view of the tensioning device shown attached to a shaft in an untensioned condition and with the housing removed.

A drive member such as a worm 120, best shown in FIG. 3, is rotatably connected to the mounting plate 110 by an upper bearing member 122 and a lower bearing member 124 for rotation about a longitudinal axis 126 of the worm 120. The bearing members 122 and 124 are attached to the mounting plate 110. The longitudinal axis 126 of the worm 120 is distinct from the axis 30 about which the worm gear 100 rotates. The longitudinal axis 126 is generally perpendicular to and spaced apart from the axis 30. The worm 120 includes a hexagonal head 128 and a shank having a spiral tooth or thread 130. The worm 120 is associated in operative engagement with the worm gear 100 wherein the spiral thread 130 of the worm 120 intermeshes with the teeth 106 of the worm gear 100 such that rotation of the worm 120 about the axis 126 provides a corresponding rotation of the worm gear 100 about the axis 30. The worm 120 may be rotated in a clockwise or counterclockwise direction about the axis 126 as desired. The thread 130 on the worm 120 is preferably a right-hand thread, however, a left-hand thread may be used if desired. The spiral thread 130 of the worm 120 has a pitch such that the selective rotation of the worm 120 about the axis 126, created by rotation of the head 128, will cause a corresponding rotation of the worm gear 100 about the axis 30, but such that a rotational force applied to the worm gear 100 by the torsion tube 40 will not cause the worm 120 to rotate about the axis 126. The worm 120 thereby selectively locks the worm gear 100 in a stationary position. Other gearing arrangements such as a spur gear and a helical gear may be used in place of the worm gear 100 and the worm 120. In certain environments with high vibration additional locking arrangements may be required.

A housing 136 is best shown in FIG. 2 having a peripheral side wall 138 and a front wall 140 removably attached to the mounting plate 110. The front wall 140 includes an aperture forming a circular rim 142. The rim 142 is slightly larger in diameter than the outer surface 45 of the torsion tube 40 such that the torsion tube 40 will extend through and rotate freely within the aperture formed by the rim 142. The housing 136 encloses the worm gear 100 and the worm 120 except for the hexagonal head 128 of the worm 120 which projects outwardly from the housing 136 such that a wrench or other device may be attached to the head 128 by an operator to provide selective rotation of the worm 120.

Figure 5:
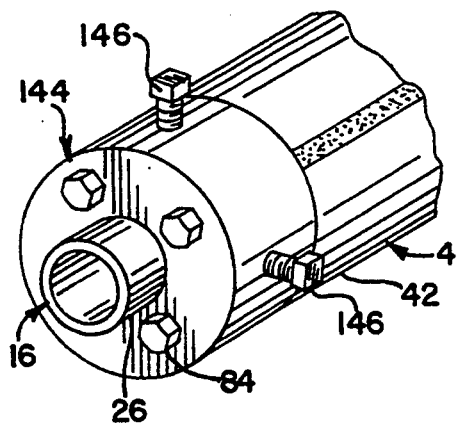
FIG. 5 shows a first modified embodiment of the hub of the tensioning device.

FIG. 5 shows an alternate embodiment of the tensioning device 10 having a hub 144. The hub 144 is similar to the hub 70 except that it does not include radial bores 80. The hub 144 additionally includes a plurality of set screws 146 which are threadably attached to the hub 144. The set screws 146 are adapted to selectively engage the shaft 16 to connect the hub 144 and the first end 42 of the torsion tube 40 to the first end 26 of the shaft 16.

Figure 6:
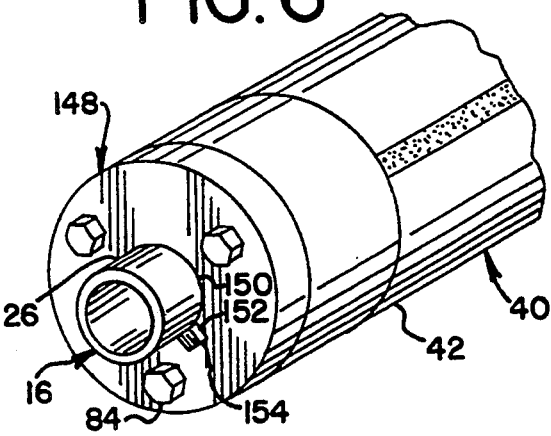
FIG. 6 shows a second modified embodiment of the hub of the tensioning device.

FIG. 6 shows another embodiment of the tensioning device 10 having a hub 148 connecting the first end 42 of the torsion tube 40 to the first end 26 of the shaft 16. The hub 148 includes a central aperture 150 which includes a keyway 152. A key 154, sized to fit closely within the keyway 152, is attached to the first end 26 of the shaft 16. The key 154 interlocks with the keyway 152 to provide a rotational connection between the first end 42 of the torsion tube 40 and the first end 26 of the shaft 16 while allowing the hub 148 and torsion tube 40 to slide longitudinally along the shaft 16 and off of the shaft 16 if desired.

Figure 7:
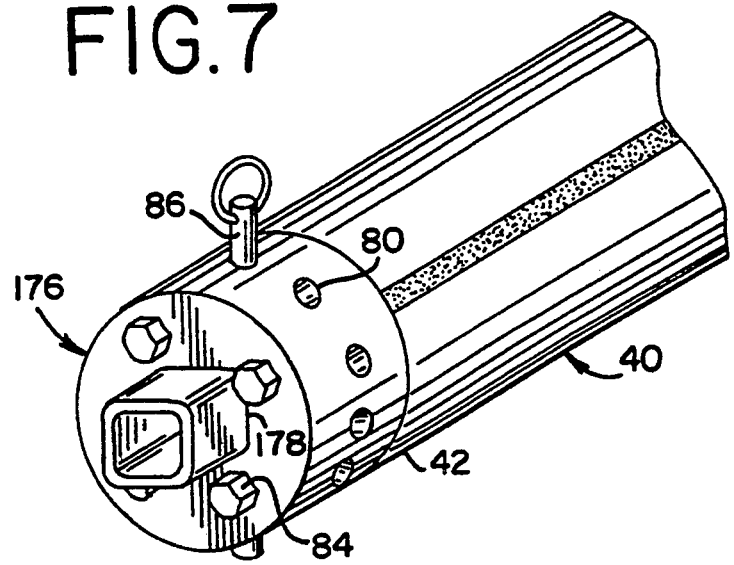
FIG. 7 shows a third modified embodiment of the hub of the tensioning device.
Figure 8:
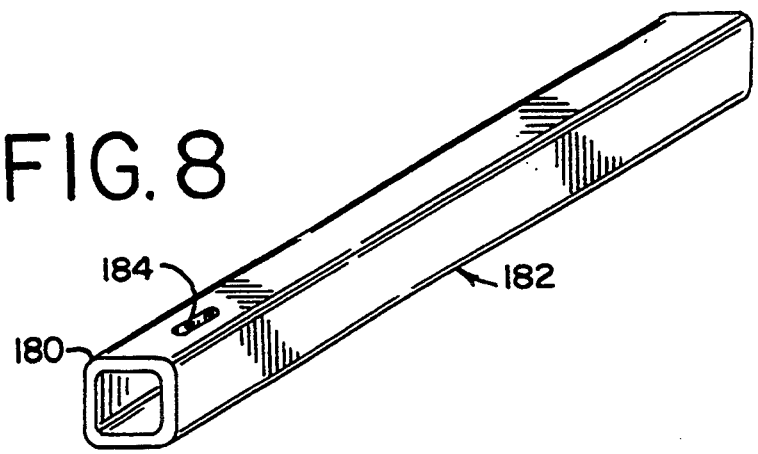
FIG. 8 is a perspective view of a rectangular shaft for use with the tensioning device.

FIG. 7 shows an alternate embodiment of the tensioning device 10 having a hub 176. The hub 176 is similar to the hub 70 except that it includes a generally rectangular bore 178 in place of the circular bore 72 which is shown in the hub 70. The hub 176 is connected to the first end 42 of the torsion tube 40 and is selectively connectable to the first end 180 of a rectangular shaft 182. As best shown in FIG. 8, the rectangular shaft 182 is preferably a rectangular tube, however, a solid rectangular shaft may also be used. The first end 180 of the rectangular shaft 182 includes a pair of slotted apertures 184 (only one shown) which extend through opposing walls of the shaft 182 in alignment with one another. The slotted apertures 184 extend longitudinally along the length of the rectangular shaft 182 such that the pin 86 and hub 176 may slide back and forth longitudinally along the shaft 182 as allowed by the length of the slots 184. The rectangular bore 178 is sized to fit closely around the rectangular shaft 182 such that the hub 176 will engage the shaft 182 and rotate conjointly with the shaft 182. The pin 86 is inserted through the apertures 80 in the hub 176 and the slotted apertures 184 in the shaft 182 to limit the longitudinal sliding movement of the hub 176 along the shaft 182. While the hub 176 is shown in use with a rectangular shaft 182, the hub 176 may also be used in connection with the circular shaft 16. In such an arrangement the pin 86 will selectively couple the hub 176 to the circular shaft 16 for conjoint rotation while allowing limited sliding movement of the hub 176 along the circular shaft 16.

Figure 9:
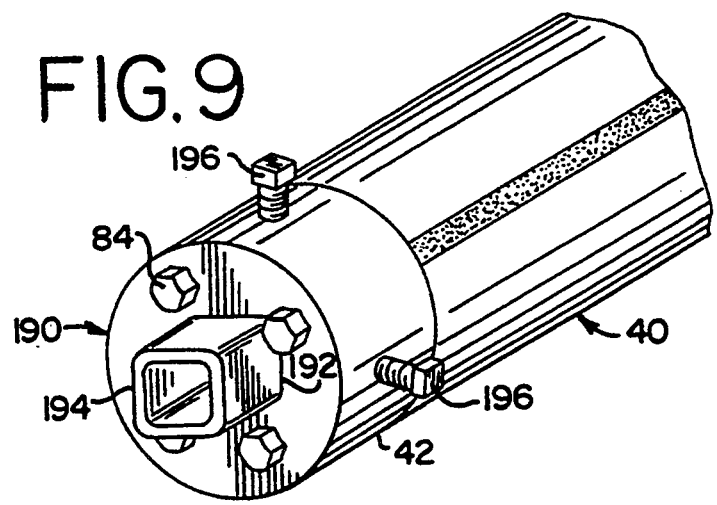
FIG. 9 shows a fourth modified embodiment of the hub of the tensioning device.

FIG. 9 shows another alternate embodiment of the tensioning device 10 having a hub 190. The hub 190 is connected to the first end 42 of the torsion tube 40 in the same manner as is the hub 70. The hub 190 includes a rectangular bore 192 which is adapted to fit closely around a rectangular shaft 194. The rectangular bore 192 couples the hub 190 to the rectangular shaft 194 for conjoint rotation while allowing sliding movement of the hub 190 along the shaft 194. The hub 190 may additionally include a pair of set screws 196 which are threadably engaged to the hub 190 and which are adapted to selectively engage the rectangular shaft 194 should it be desired to prevent longitudinal movement of the hub 190 along the rectangular shaft 194. The hub 190 may also be used in connection with a circular shaft such as the shaft 16 in which case the set screws 196 will selectively connect the hub 190 to the circular shaft for conjoint rotation.

As best shown in FIG. 2, the tensioning device 10 includes a torsion indicator 156 for indicating and displaying the magnitude of torsional force being applied to a first member such as the shaft 16. The torsion indicator 156 includes a position indicating visual display member such as a stripe 158 having a first end 160 and a second end 162. The first end 160 of the stripe 158 is located at and visually indicates the rotational position of the first end 42 of the torsion tube 40 and the second end 162 of the stripe 158 is located at and visually indicates the rotational position of the second end 44 of the torsion tube 40. The first end 160 and the second end 162 of the stripe 158 are longitudinally aligned with one another when the torsion tube 40 is in an untensioned condition as shown in FIG. 3. The stripe 158 may be painted on the outer surface 45 of the torsion tube 40 in a contrasting color to the color of the outer surface 45 or the stripe 158 may be formed by a tape or ribbon attached to the outer surface 45 of the torsion tube 40. The stripe 158 need not extend the entire length of the tube 40 and may only be located at each end of the tube 40 with a gap between the ends 160 and 162. More than one stripe 158 may be located on the tube 40. Other means tier visually indicating the rotational position of the ends 42 and 44 of the tube 40 such as arrows or other markings in various shapes, as well as raised or indented markings on the surface 45 of the tube 40, may also be used.

The torsion indicator 156 may also include a sleeve member 164 for visually indicating the amount or degree of rotational movement of the second end 44 of the torsion tube 40. The sleeve member 164 includes a collar 166 which extends around the outer surface 45 of the torsion tube 40. The collar 166 extends through and fits closely within the rim 142 of the housing 136. The collar 166 includes a circular rim 168 at one end and an outwardly extending lip 170 at the other end which is located within the housing 136. The sleeve member 164 is rotatably attached to the housing 136 for rotation about the axis 30. The second end 44 of the torsion tube 40 may rotate freely within the sleeve member 164 without causing any rotation to the sleeve member 164. A graduated scale 172 having a plurality of index marks 174 is located on the collar 166 along the rim 168 to provide for the visual measurement of the movement of the second end 162 of the torsion indicator 156 and the corresponding rotational movement of the second end 44 of the torsion tube 40. The graduated scale 172 may be numbered as shown in FIG. 2 to indicate various belt widths or degrees of rotation.

The torsion indicator 156 may be used with various types of tensioning devices for conveyor belt cleaners other than the tensioning device 10 described herein. The torsion indicator 156 may be used with any tensioner including a resilient torsion member, such as the torsion tube 40, and including any mechanism for providing relative rotation between the first and second ends of the torsion member, such as the worm gear 100 and worm 120, a rotatable shaft and set screws, or any other equivalent mechanism.

In operation, the tensioning device 10 of FIGS. 2-4 is slid over the first end 26 of the shaft 16 by inserting the first end 26 through the bores in the bushing 114, the torsion tube 40 and the hub 70. The mounting plate 110 is rigidly fastened to the conveyor chute 12 such that there can be no relative movement between the mounting plate 110 and the chute 12. The shaft 16 is then rotated about the axis 30 to rotate the scraping edges 20 of the scraper blades 18 towards the conveyor belt 22 to a position wherein the apertures 32 in the shaft 16 align with a pair of opposing radial bores 80 in the hub 70. The first end 88 of the pin 86 is then inserted through the bores 80 and the slotted apertures 32 thereby connecting the first end 42 of the torsion tube 40 and the hub 70 to the first end 26 of the shaft 16 for conjoint rotation. The worm 120 may then be rotated in the appropriate direction about the axis 126 by an operator using a wrench or other device applied to the head 128. As the worm 120 is rotated about the axis 126, the worm 120 rotates the worm gear 100 about the axis 30 which in turn rotates the first end 42 and the second end 44 of the torsion tube 40 and the shaft 16 about the axis 30 until the scraping edges 20 of the scraper blades 18 engage the conveyor belt 22. Once the scraper blades 18 have been rotated into contact with the conveyor belt 22, and before a torsional force is created and stored in the torsion tube 40, the sleeve member 164 is rotated such that the "0" index mark 174 on the graduated scale 172 is aligned with the second end 162 of the stripe 158.

Further rotation of the worm 120 about the axis 126 will cause further rotation of the worm gear 100 and the second end 44 of the torsion tube 40 about the axis 30, however, the first end 42 of the torsion tube 40 and the shaft 16 will remain stationary as the scraper blades 18 are engaged against the conveyor belt 22. Consequently further rotation of the worm 120 will provide relative rotation of the second end 44 with respect to the first end 42 of the torsion tube 40 thereby creating and storing a torsional or rotational biasing force in the torsion tube 40 and "tensioning" the torsion tube 40. The torsional biasing force input and stored in the torsion tube 40 is applied to the shaft 16. The worm 120 can rotate the worm gear 100 and the second end 44 of the torsion tube 40 to any of a number of infinitely variable positions to input selected amounts of torsional biasing force into the torsion tube 40 for transmission to the shaft 16.

As the second end 44 of the torsion tube 40 is rotated with respect to the first end 42, the torsion tube 40 will twist and coil up such that the distance between the first and second ends 42 and 44 of the torsion tube 40 will shorten. The hub 70 will slide along the shaft 16 and the pin 86 will slide within the slots 32 to accommodate the shortening of the torsion tube 40 during tensioning and the subsequent lengthening of the torsion tube 40 as it untwists during operation. In those embodiments of the tensioning device such as shown in FIG. 5 and 9 wherein the hub 144 is prevented from sliding longitudinally along the shaft 16, the lengthening and shortening of the torsion tube 40 is compensated for by a corresponding movement of the shaft 16 along the axis 30. Any such movement is quite small, usually less than one inch and depends upon the length of the tube and its wall thickness. A separate tensioning device 10 may be attached to each end of the shaft 16, 182 or 194 when the tensioning devices 10 include hubs, such as the hubs 70, 148, 176 or 190 which are allowed to slide along the shaft to compensate for the lengthening and shortening of the torsion tube 14. When the tensioning device 10 includes a hub which prevents sliding movement of the hub along the shaft preferably only one such tensioning device 10 should be connected to the shaft.

The pitch of the spiral thread 130 of the worm 120 is preferably such that an operator can manually rotate the worm 120 about the axis 126 to thereby rotate the worm gear 100 and second end 44 of the torsion tube 40, but such that a rotational force applied to the worm gear 100, such as by the rotation of the shaft 16, will not allow the worm gear 100 or the worm 120 to rotate or move in any direction. The worm 120 thereby locks the worm gear 100 and second end 44 of the torsion tube 40 in a stationary selected position until such time as when the worm 120 is intentionally rotated by an operator. Other mechanisms for selectively locking the worm gear 100 in a stationary position such as pawls and ratchets may be used. Any rotational movement of the torsion tube 40, other than intentional rotation by an operator, will occur at the first end 42 away from the operator and the worm 120. It may therefore be preferable to have the pin 86 or the set screws 146 recessed in the hubs 70 or 144, or to use the hub 148 to eliminate any rotational hazard at the first end 42. This arrangement prevents injury to an operator who may have a wrench attached to the drive member when a splice passes across the cleaner blades and tends to rotate the shaft.

As the second end 44 of the torsion tube 40 is rotated with respect to the first end 42, the second end 162 of the stripe 158 rotates about the axis 30 visually indicating against the index marks 174 of the scale 172 the amount or degree of rotation provided to the second end 44 of the torsion tube 40 with respect to the first end 42 from its initial untensioned position. The amount of torsional force being applied to the shaft 16 by the torsion tube 40 corresponds to the degree of relative rotation between the second end 44 and the first end 42 of the torsion tube 40.

In general, as conveyor belt width increases, a larger rotational force must be applied to the shaft 16 in order to adequately press the scraper blades 18 against the conveyor belt 22. The index marks 174 in the graduated scale 172 may therefore be marked with the appropriate belt width to which the second end 162 of the stripe 158 should be rotated to provide the appropriate rotational force to the shaft 16 for a particular belt width* Although the graduated scale 172 on the sleeve member 164 is preferred to provide an accurate visual indication of the amount of relative rotation between the second end 44 and first end 42 of the torsion tube 40 by measuring the rotation of the second end 162 of the stripe 158 from the untensioned position of the torsion tube 40, the relative rotation between the second end 44 and the first end 42 of the torsion tube 40 may also be measured by observing the change in the longitudinal positions between the second end 162 and the first end 160 of the stripe 158 as shown in FIG. 2. As the second end 44 of the torsion tube 40 is rotated with respect to the first end 42, the second end 162 of the stripe 158 will rotate progressively further from longitudinal alignment with the first end 160 of the stripe 158 thereby visually indicating the amount of torsional force stored within the tube 40 and applied to the shaft 16.

When the torsion tube 40 of the tensioning device 10 is in a tensioned condition as shown in FIG. 2, the torsional biasing force stored within the torsion tube 40 will force the scraper blades 18 into contact with the conveyor belt 22. As the scraping edges 20 on the scraper blades 18 wear down from scraping engagement with the conveyor belt 22, the torsion tube 40 will begin to untwist whereby the first end 42 of the torsion tube will rotate with respect to the second end 44 to rotate the shaft 16 about the axis 30 and the scraper blades 18 into continuing engagement with the conveyor belt 22. As the scraper blades 18 continue to wear the torsion tube 40 will continue to rotate the shaft 16 and scraper blades 18 into contact with the conveyor belt 22 until the torsion tube 40 returns to its untensioned condition as shown in FIG. 3. As the torsion tube 40 untwists from its tensioned condition the first end 160 of the stripe 158 will rotate while the second end 162 of the stripe 158 will remain stationary. The difference in the longitudinal alignment of the second end 162 with the first end 160 of the stripe 158 continues to visually show the amount of torsional force stored within the torsion tube 40 and being applied to the shaft 16.

During operation of the belt cleaner 14 the shaft 16 will rotate clockwise and/or counterclockwise in response to forces which are transmitted to the scraper blades 18 by large pieces of adherent material on the belt 22 or conveyor belt splices, In addition the conveyor belt 22 may grab the scraper blades 18 and pull them from the position shown in FIG. 1 between the shaft 16 and the pulley 24 to a location below the pulley 24 thereby creating a large and sudden rotation of the shaft 16. Such rotations of the shaft 16 cause a corresponding rotation of the hub 70 and the first end 42 of the torsion tube 40. The torsion tube 40 acts as a shock absorber and absorbs some of the rotational forces created by such rotations of the shaft 16 before these forces are transmitted to the worm gear 100 and worm 120. However, even those forces created by the rotation of the shaft 167 which are not absorbed by the torsion tube 40 and which are transmitted to the worm gear 100 and worm 120, do not cause any rotation or other movement of the second end 44 of the torsion tube 40, the worm gear 100 or the worm 120. Consequently rotations of the shaft 16 due to movements of the scraper blades 18 during operation of the belt cleaner 14 are not transmitted to the worm 120 and are not transmitted to an operator who may be in engagement with the worm 120 thereby preventing any potential injury to the operator.

While the tensioning device 10 has been shown in FIG. 1 as located on the exterior of the conveyor chute 12, the torsion tube 40 and hub 70 may be located in the interior of the chute 12 between the mounting plate 110 and the scraper blades 18 by modifying the bushing 114 such that the collar 118 is connectable to the worm gear 100 and the second end 44 of the torsion tube 40. Such a modified arrangement (not shown) will save space by reducing the projection of the tensioning device 10 outside of the chute 12.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tensioning device for imparting torsional bias to a shaft including a resilient torsion coupling member having a first end and a second end; connector means adapted to connect said first end of said coupling member to the shaft for rotation therewith; a driven member connected to said second end of said coupling member, said driven member being relatively rotatable with respect to the shaft about a first axis; a drive member associated with said driven member for selectively rotating said driven member to any of a number of positions, said drive member being rotatable about a second axis distinct from said first axis; whereby rotation of said drive member rotates said driven member and thereby rotates the shaft to a desired position and whereby further rotation of said drive member operates to store a torsional biasing force in said coupling member when said second end of said coupling member is rotated with respect to said first end of said coupling member.

2. The tensioning device of claim 1 wherein said connector means comprises a hub connected to said first end of said coupling member and means for selectively connecting said hub to the shaft.

3. The tensioning device of claim 2 wherein said selective connector means comprises at least one set screw threadably engaged to said hub.

4. The tensioning device of claim 2 wherein said selective connector means comprises a pin adapted to be inserted through said hub and the shaft.

5. The tensioning device of claim 1 wherein said drive member is in intermeshing engagement with said driven member.

6. The tensioning device of claim 5 wherein said driven member comprises a gear member.

7. The tensioning device of claim 6 wherein said drive member comprises a toothed member in intermeshing engagement with said gear member.

8. The tensioning device of claim 7 wherein said toothed member comprises a worm member.

9. The tensioning device of claim 8 wherein said worm member includes means for connecting said worm member to a means for providing rotation of said worm member about said second axis.

10. The tensioning device of claim 1 including a housing for enclosing said driven member and for at least partially enclosing said drive member.

11. The tensioning device of claim 1 including indicator means on said coupling member for indicating the degree of rotation of said second end of said coupling member with respect to said first end of said coupling member thereby indicating whether a torsional biasing force is stored in said coupling member and the extent of stored torsional biasing force.

12. The tensioning device of claim 1 wherein said coupling member is a tube.

13. A tensioning device for imparting torsional bias to a shaft including a resilient torsion coupling member having a first end and a second end; connector means adapted to connect said first end of said coupling member to the shaft for rotation therewith; a driven member connected to said second end of said coupling member, said driven member being relatively rotatable with respect to the shaft about an axis; a drive member in operative engagement with said driven member for selectively rotating said driven member about said axis to any of a number of positions; and means for locking said driven member against rotation such that said driven member cannot rotate except by said selective rotation of said drive member; whereby rotation of said drive member is effective to rotate the shaft to a desired position and to store torsional biasing force in said coupling member when said second end of said coupling member is rotated with respect to said first end of said coupling but said locking means is effective to prevent the transmission of movement from the shaft to said drive member.

14. The tensioning device of claim 13 in which said driven member is rotated about a first axis and said drive member is rotated about a second axis distinct from said first axis.

15. The tensioning device of claim 13 wherein said connector means comprises a hub connected to said first end of said coupling member and means for selectively connecting said hub to the shaft.

16. The tensioning device of claim 15 wherein said selective connector means comprises at least one set screw threadably engaged to said hub.

17. The tensioning device of claim 15 wherein said selective connector means comprises a pin adapted to be inserted through said hub and the shaft.

18. The tensioning device of claim 13 wherein said driven member comprises a gear member and said drive member comprises a worm member.

19. The tensioning device of claim 13 wherein said driven member comprises a gear member and said drive member and said locking means comprise a worm member.

20. The tensioning device of claim 13 including indicator means on said coupling member for indicating the degree of rotation of said second end of said coupling member with respect to said first end of said coupling member thereby indicating whether a torsional biasing force is stored in said coupling member and the extent of stored torsional biasing force.

21. A device for imparting torsional force to a shaft and displaying the amount of stored force including a resilient torsion member having a first end, a second end and an exterior surface; means adapted to connect said first end of said torsion member to the shaft; means for rotating said second end of said torsion member relative to said first end to a desired position thereby storing torque in said torsion member; and means on said exterior surface of said torsion member for visually displaying the extent of relative rotation between said second end of said torsion member and said first end which display corresponds with the amount of torque stored in said torsion member.

22. The device of claim 21 wherein said visual display means includes first means attached to said second end of said torsion member for indicating the position of said second end of said torsion member and means for measuring rotational movement of said first position indicating means, said measuring means including graduations located adjacent said first position indicating means.

23. The device of claim 22 including second position indicating means attached to said first end of said torsion member.

24. The device of claim 21 wherein said visual display means includes a first position indicating means attached to said second end of said torsion member and a second position indicating means attached to said first end of said torsion member.

25. The device of claim 24 wherein said first and second position indicating means comprise respective ends of a stripe located on said torsion member.

26. The device of claim 24 wherein said means for rotating includes a gear member attached to said second end of said torsion member and a rotatable worm member in operative engagement with said gear member, whereby selective rotation of said worm member provides a corresponding rotation of said gear member.

27. The device of claim 21 wherein said torsion member comprises an elastomeric tube.

28. The device of claim 27 wherein said visual display means includes means for indicating the position of said second end of said tube and a sleeve member located adjacent said second end of said tube, said sleeve member including graduations for measuring movement of said position indicating means.

* * * * *